(12) United States Patent
Watkins et al.

(10) Patent No.: US 10,944,649 B2
(45) Date of Patent: Mar. 9, 2021

(54) CRM INTEGRATED CHAT WITH AUTHORIZATION MANAGEMENT

(71) Applicant: DISH Network L.L.C., Englewood, CO (US)

(72) Inventors: Raymond Watkins, Colorado Springs, CO (US); Duncan McCloud, Aurora, CO (US); Dave Downing, Castle Rock, CO (US); Benjamin Husser, Centennial, CO (US); Bishnu Panda, Parker, CO (US)

(73) Assignee: DISH Network L.L.C., Englewood, CO (US)

( * ) Notice: Subject to any disclaimer, the term of this patent is extended or adjusted under 35 U.S.C. 154(b) by 249 days.

(21) Appl. No.: 15/985,123

(22) Filed: May 21, 2018

(65) Prior Publication Data

US 2019/0356562 A1 Nov. 21, 2019

(51) Int. Cl.
*H04L 12/24* (2006.01)
*H04L 12/58* (2006.01)
*H04L 29/06* (2006.01)
*G06F 9/451* (2018.01)
*G06F 9/54* (2006.01)

(52) U.S. Cl.
CPC .......... *H04L 41/5064* (2013.01); *G06F 9/451* (2018.02); *G06F 9/547* (2013.01); *H04L 51/04* (2013.01); *H04L 63/08* (2013.01); *H04L 63/102* (2013.01); *H04L 65/1069* (2013.01)

(58) Field of Classification Search
CPC . H04L 41/5064; H04L 51/04; H04L 65/1069; H04L 63/08; H04L 63/102; H04L 63/105; G06F 9/451; G06F 9/547
See application file for complete search history.

(56) References Cited

U.S. PATENT DOCUMENTS

| 7,336,293 | B2 | 2/2008 | Honda et al. |
| 7,336,779 | B2 | 2/2008 | Boyer et al. |
| 2005/0086290 | A1* | 4/2005 | Joyce ..................... G06Q 10/06 709/202 |
| 2005/0289226 | A1* | 12/2005 | Mohammed ............ G06F 21/33 709/208 |
| 2011/0179102 | A1 | 7/2011 | Ravichandran et al. |
| 2012/0224020 | A1* | 9/2012 | Portman ............. H04M 3/5133 348/14.02 |

(Continued)

*Primary Examiner* — Caroline H Jahnige
(74) *Attorney, Agent, or Firm* — Kilpatrick Townsend & Stockton LLP

(57) ABSTRACT

Various arrangements are presented for allowing a remote expert to assist a customer relationship management (CRM) agent. A CRM system may present details about an accessed customer account and an option to remotely contact an expert, wherein the expert has more access rights to a CRM communication system than the CRM agent. A request to contact the expert and a selection of a subject matter from a plurality of subject matters may be received. The request may be routed to the expert based on expert routing rules enforced by the CRM communication system. A chat communication session with the expert may be initiated. The expert CRM client system may be caused to access the customer account. Details about the accessed customer account and a chat interface to communicate with the CRM agent may be output.

19 Claims, 11 Drawing Sheets

(56) References Cited

U.S. PATENT DOCUMENTS

| | | | |
|---|---|---|---|
| 2013/0262168 A1* | 10/2013 | Makanawala | H04L 51/32 705/7.14 |
| 2014/0355750 A1* | 12/2014 | Chan | H04M 3/5175 379/265.05 |
| 2016/0371756 A1* | 12/2016 | Yokel | G06Q 30/0613 |

* cited by examiner

FIG. 2

CRM INTEGRATED CHAT WITH AUTHORIZATION MANAGEMENT

BACKGROUND

When a customer contacts a company's customer support, the voice-based or text-based interactions are often handled by an agent that has limited training. This agent may be able to access the customer's account through a customer relationship management (CRM) system and perform basic tasks and help resolve basic problems. However, in some circumstances, the agent may not have the know-how or the access rights necessary to remedy a situation encountered by the customer.

To address such situations, the agent may typically signal to a superior that additional help is necessary. In a call center, this may involve the agent physically signaling to or calling an expert or superior who is physically moving between different agents and offering assistance. Such an arrangement may not be efficient. For instance, an expert or superior assisting a first group of agents may be inundated with requests for help, while an expert or superior assisting a second group of agents physically separated from the first group may be idle. Additionally, by requiring the expert or superior to physically move among agents, time may be wasted in transit. Further, the particular expert or superior helping a particular group of agents may not be well-trained in a particular subject matter in which the agent requires help.

SUMMARY

Various embodiments are described related to a method for allowing a remote expert to assist a customer relationship management (CRM) agent. In some embodiments, a method for allowing a remote expert to assist a customer relationship management (CRM) agent is described. The method may include performing, by a CRM client system, a login process to log in the CRM agent to the CRM client system that accesses a CRM communication system. The method may include accessing, by a CRM client system, a customer account. The method may include outputting, by the CRM client system, a first CRM interface that presents details about the accessed customer account and an option to remotely contact an expert. The expert may have more access rights to the CRM communication system than the CRM agent. The method may include receiving, by the CRM client system, a request to contact the expert and a selection of a subject matter from a plurality of subject matters. The method may include routing, by the CRM communication system, the request to the expert based on expert routing rules enforced by the CRM communication system. The method may include, in response to the routing, initiating, by the CRM communication system, to an expert CRM client system to which the expert has logged in, a chat communication session. The method may include, in response to the routing, causing, by the CRM communication system, the expert CRM client system to access the customer account. The method may include outputting, by the expert CRM client system, a second CRM interface that presents details about the accessed customer account and a chat interface to communicate with the CRM agent via the CRM client system.

Embodiments of such a method may include one or more of the following features: The method may include receiving, by the expert CRM client system, a request for remote control of the CRM client system. The method may include transmitting, by the CRM communication system, the request for remote control to the CRM client system. The method may include providing, by the CRM client system, control of the CRM interface to the expert CRM client system. The method may include routing, by the CRM communication system, chat messages from the CRM client system to the expert CRM client system and from the expert CRM client system to the CRM client system. Causing the expert CRM client system to access the customer account may include transmitting, by the CRM communication system, an account identifier of the customer account to a designated port of the expert CRM client system. Causing the expert CRM client system to access the customer account may include loading, by the expert CRM client system, the customer account using the account identifier. The method may include receiving, from the expert CRM client system, feedback indicative of a competency level of the CRM agent. The method may include updating, by the CRM communication system, a database entry linked with the CRM agent. The feedback may include receiving, from the expert CRM client system, one or more tags to classify a type of issue experienced by the CRM agent. The feedback may include updating, by the CRM communication system, a database entry linked with a session. Routing the request to the expert may include selecting the expert from a plurality of experts based on an idle time since a previous request was resolved. Routing the request to the expert may include selecting the expert from a plurality of language groups based on a language indicated by the request. The method may include assigning, by the CRM communication system, one or more subject matter tags to an expert user account linked with the expert. The subject matter tags may define subjects in which the expert is proficient. The method may include updating a database entry for the expert to include the one or more subject matter tags.

In some embodiments, a system for allowing a remote expert to assist a customer relationship management (CRM) agent is described. The system may include a CRM client system configured to perform a login process to log in the CRM agent to the CRM client system that accesses a CRM communication system. The system may be configured to access a customer account. The system may be configured to output a first CRM interface that presents details about the accessed customer account and an option to remotely contact an expert. The expert may have more access rights to the CRM communication system than the CRM agent. The system may be configured to receive a request to contact the expert and a selection of a subject matter from a plurality of subject matters. The system may include the CRM communication system configured to route the request to the expert based on expert routing rules enforced by the CRM communication system. The system, in response to the routing, may initiate with an expert CRM client system to which the expert has logged in, a chat communication session. The system, in response to the routing, may cause the expert CRM client system to access the customer account. The system may include the expert CRM client system, configured to present details about the accessed customer account and a chat interface to communicate with the CRM agent via the CRM client system.

Embodiments of such a system may include one or more of the following features: The expert CRM client system may be further configured to receive a request for remote control of the CRM client system. The CRM communication system may be further configured to transmit the request for remote control to the CRM client system. The CRM client system may be further configured to provide control of the CRM interface to the expert CRM client system. The CRM communication system may be further configured to route chat messages from the CRM client system to the expert CRM client system and from the expert CRM client system to the CRM client system. The expert CRM client system accessing the customer account may include the CRM communication system being configured to transmit an account identifier of the customer account to a designated port of the expert CRM client system. The expert CRM client system accessing the customer account may include the expert CRM client system loading the customer account using the account identifier. The expert CRM client system may be further configured to receive feedback indicative of a competency level of the CRM agent. The CRM communication system may be further configured to update a database entry linked with the CRM agent. The feedback may further include the expert CRM client system being configured to receive one or more tags to classify a type of issue experienced by the CRM agent. The feedback may further include the CRM communication system being configured to update a database entry linked with a session. Routing the request to the expert may include selecting the expert from a plurality of experts based on an idle time since a previous request was resolved. Routing the request to the expert may include selecting the expert from a plurality of language groups based on a language indicated by the request. The CRM communication system may be configured to assign one or more subject matter tags to an expert user account linked with the expert. The subject matter tags may define subjects in which the expert is proficient. The CRM communication system may be configured to update a database entry for the expert to include the one or more subject matter tags.

In some embodiments, an apparatus for allowing a remote expert to assist a customer relationship management (CRM) agent is described. The apparatus may include means for accessing a customer account. The apparatus may include means for outputting a first CRM interface that presents details about the accessed customer account and an option to remotely contact an expert. The apparatus may include means for receiving a request to contact the expert and a selection of a subject matter from a plurality of subject matters. The apparatus may include means for routing the request to the expert based on enforced expert routing rules. The apparatus may include means for initiating a chat communication session with the expert. The apparatus may include means for causing an expert CRM client system being used by the expert to access the customer account. The apparatus may include means for outputting a second CRM interface that presents details about the accessed customer account and a chat interface to communicate with the CRM agent.

BRIEF DESCRIPTION OF THE DRAWINGS

FIG. 2 illustrates an embodiment of an agent CRM interface having an option to contact an expert.

DETAILED DESCRIPTION

Embodiments detailed herein disclose a customer relationship management (CRM) communication system that allows an expert located at a remote location from an agent to provide remote assistance. The expert may have additional training or more real-world experience than the agent and/or may have additional access rights to a CRM system. If an agent is unable to remedy a problem or otherwise resolve an issue with a customer, the agent may activate a chat-session through the CRM interface with an expert. The agent may indicate specifics of the issue, which may be used to route the request to an appropriate expert. The CRM communication system may use various factors, including language, expert idle time, and the subject matter of the issue to select a particular remotely-located expert to be placed into communication with the agent.

Initially, a text-based chat session may be requested by the agent, and in response, initiated between the agent and the expert. The integrated CRM communication system may automatically load or may prompt the expert's CRM client system to load a customer account that was being accessed by the agent when the chat session was requested. The expert may review the account via a CRM interface and communicate with the agent via the chat session. If needed, the expert may be able to assume control of the agent's client system. By taking such control, the expert can efficiently teach the agent how to perform a task.

When ready to conclude the session, the expert may have the option of leaving feedback about the agent and about the problem which the agent contacted the expert about. Such feedback may be used to identify: problems with particular agents (e.g., contacting experts for tasks which the agent should know how to perform); lapses in training (e.g., multiple agents contacting experts for tasks which the agents are expected to perform); and recurring problems which require expert assistance. The agent may also leave feedback about the expert.

Such arrangements have the technical advantage of removing the need for a local supervisor to travel to and assist an agent in person and, potentially, provide an override directly to a CRM client system of the agent. Arrangements detailed herein allow for an agent to receive assistance and pass control of the CRM agent system to an expert operating remotely.

Figure 1:
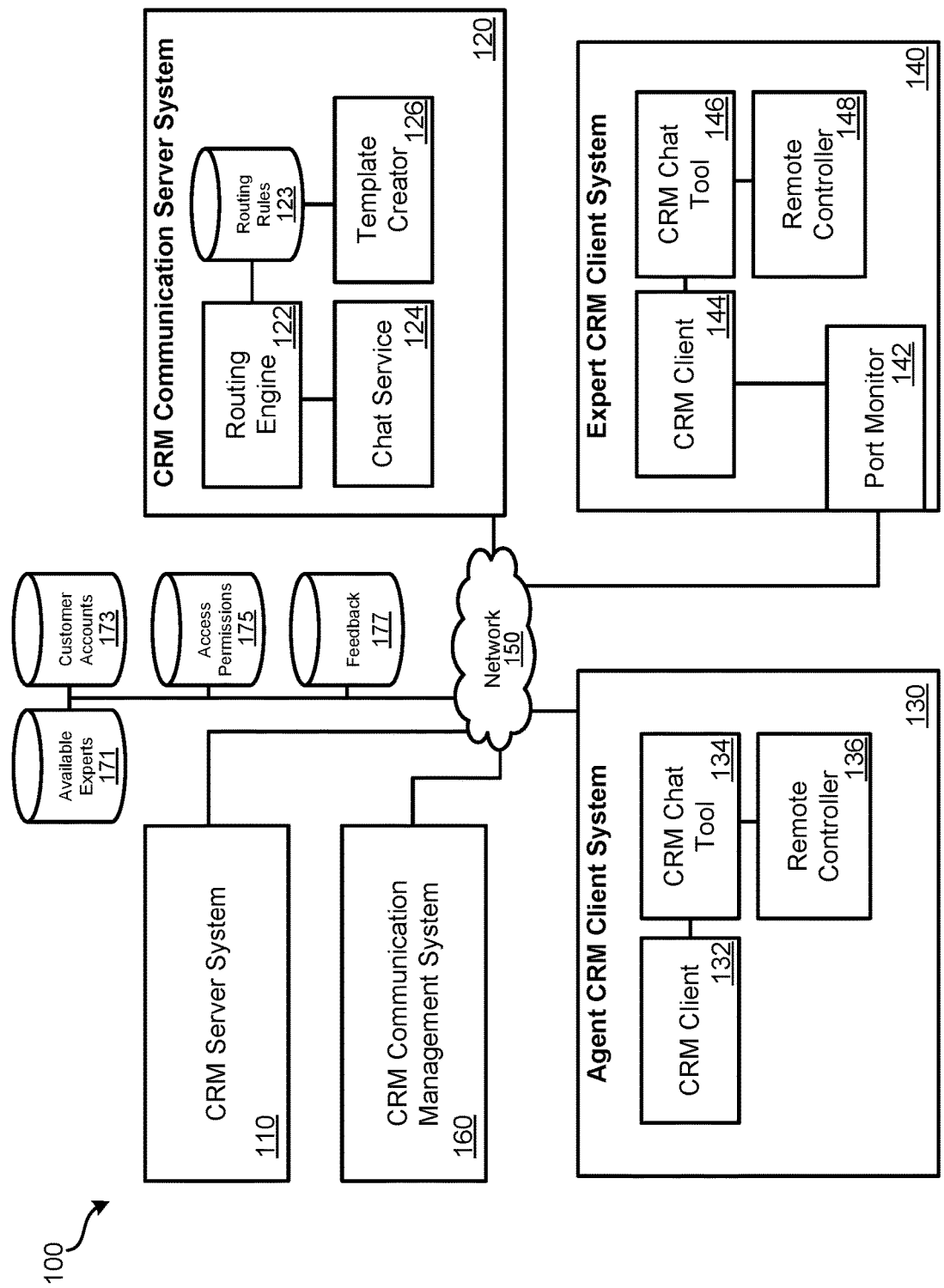
FIG. 1 illustrates an embodiment of an integrated CRM communication system.

Greater detail is provided in relation to the figures. FIG. 1 illustrates an embodiment of an integrated CRM communication system 100. Integrated CRM communication system 100 may include: CRM server system 110, CRM communication server system 120, agent CRM client system 130, expert CRM client system 140, network 150, and CRM communication management system 160. Each of CRM server system 110, CRM communication server system 120, agent CRM client system 130, expert CRM client system 140, and CRM communication management system 160 may include computer systems that include various computerized components, including memories, network interfaces, communication buses, processors, non-transitory computer-readable storage mediums, etc. Additionally, one or more databases may be present that may be maintained as part of CRM communication system 100; such databases may include: available experts database 171, customer accounts database 173, access permissions database 175, and feedback database 177. It should be understood that the data maintained in these databases may be combined into fewer databases or may be split out into a greater number of databases. Such databases may be maintained local to CRM server system 110, CRM communication server system 120, or CRM communication management system 160. Alternatively, such databases may be maintained at a remote location from such server systems and may be accessible via a network 150. Such databases may be maintained in different locations from each other. Network 150 may include one or more public and/or private networks, which can include the Internet and a corporate intranet.

CRM server system 110 may include one or more computer server systems, which may be geographically distributed. CRM server system 110 may function to serve various agent CRM client systems, such as agent CRM client system 130 with an interface, such as a web browser-based or native interface, that allows agents to interact with customer accounts. The CRM interface may permit an agent to review a customer's account data, account history, biographical information, payment history, and any other data that may be useful to an agent to resolve a problem being experienced by a customer or to help a customer perform a particular task. The CRM interface may permit an agent to modify settings or data stored as part of the customer's account. In some embodiments, CRM communication system 100 is operated by a television service provider. Therefore, customers may have a paid subscription with the television service provider to receive various television channels. Additionally, the customers may have the ability to purchase additional individual programming (e.g., pay-per-view) and/or order additional services from the television service provider. The customer may be able to perform these functions by contacting an agent who would use agent CRM client system 130 to interact with CRM server system 110 to review and modify a customer account linked with the customer who has contacted the agent. Information regarding a customer account may be stored to customer accounts database 173. Modifications to the customer account may be made to this database.

Agent CRM client system 130 may represent a computer system, such as a desktop or laptop computer, that may access network 150 and communicate with CRM server system 110. Agent CRM client system 130 may allow an agent to provide login credentials, such as a username and password, to log in to CRM server system 110. Agent CRM client system 130 may execute a CRM client 132 which provides a CRM interface to interact with CRM server system 110. CRM client 132 may be a webpage loaded in an Internet browser served by CRM server system 110 or may be a stand-alone application executed by agent CRM client system 130. When an agent is logged in to CRM server system 110 via CRM client 132, the agent may only be able to perform functions commensurate with the agent's access level to CRM server system 110. Access permissions database 175 may store indications of various agents' accounts and their permission levels for accessing and changing data within customer accounts database 173. For example, certain tasks to be performed in relation to customer accounts database 173 may require an override. A typical agent may not be permitted to enter such an override and may require an expert to provide the override.

Integrated with CRM client 132 may be a CRM chat tool 134. CRM chat tool 134 may permit chat-based communication between an agent operating agent CRM client system 130 and an "expert." An "expert" refers to a type of agent that has: 1) access permissions greater than a standard agent; and/or 2) additional training or expertise in one or more subject matter areas that is not held by the standard agent, such that the expert can help the agent resolve certain types of problems. CRM chat tool 134 may communicate via a network 150 with CRM communication server system 120. CRM chat tool 134 may only be activated by an agent via agent CRM client system 130 when the agent either has a question about how to perform a particular task for a customer or requires an agent that has greater permissions to perform a task within CRM server system 110 to a customer's account stored as part of customer accounts 173. While FIG. 1 illustrates a single agent CRM client system, it should be understood that a large number of agent CRM client systems may be present as part of an embodiment of a system 100. That is dozens, hundreds, or even thousands of agent CRM client systems may communicate via network 150 with CRM server system 110, and CRM communication server system 120.

CRM communication server system 120 may include one or more computer server systems that may be geographically distributed. CRM communication server system 120 may include: routing engine 122, routing rules database 123, chat service 124, and template creator 126. Routing engine 122 may serve to receive a chat request from various agent CRM client systems, such as agent CRM client system 130. The request may include an account identifier indicating the customer account which is being accessed by CRM client 132 at the time the chat request was made by the agent. Routing engine 122 may include software or firmware that is executed by underlying hardware of CRM communication server system 120. In other embodiments, routing engine 122 may comprise specialty hardware. Routing engine 122 may use routing rules database 123 to determine to which expert CRM client system a chat request from an agent CRM client system should be routed. Such routing rules may include rules based on: language, subject matter expertise, and an idle duration since a previous chat session was completed by the expert. Routing rules database 123 may be dynamic in that such rules can be continuously updated using CRM communication management system 160.

Once routing engine 122 has determine the appropriate expert CRM client system to which the chat request should be routed, chat service 124 may be used to route chat communications between agent CRM client system 130 and the selected expert CRM client system, such as expert CRM client system 140. While only a single expert CRM client system 140 is illustrated as part of system 100, it should be understood that a large number of expert CRM client systems may be present in various embodiments of system 100. It can typically be expected that there will be fewer expert CRM client systems than agent CRM client systems. That is, a single expert can typically assist a sizable number of agents, so fewer experts are needed than agents. Chat service 124 may include software or firmware that is executed by underlying hardware of CRM communication server system 120. In other embodiments, chat service 124 may comprise specialty hardware. Chat service 124 may route chat messages between agent CRM client system 130 and the expert CRM client system to which routing engine 122 has assigned the chat request received from agent CRM client system 130. In the illustrated embodiment of a system 100, routing engine 122 has assigned the chat request to expert CRM client system 140. Therefore, chat messages are routed between agent CRM client system 130 and expert CRM client system 140 by chat service 124 via network 150.

Expert CRM client system 140 may include: port monitor 142, CRM client 144, CRM chat tool 146, and remote controller 148. Port monitor 142 may monitor a particular port for communication from CRM communication server system 120. CRM communication server system 120 may transmit an account identifier linked with the chat request received from agent CRM client system 130 to a particular port of expert CRM client system 140. Port monitor 142 may receive this account identifier and may use CRM client 144 to load the customer account linked with the received account identifier. CRM client 144 may, in response to port monitor 142 receiving the customer account identifier, load the customer account for viewing in the CRM interface of CRM client 144. Alternatively, the expert may have the option of selecting an option to cause the customer account linked with the customer account identifier to be loaded.

CRM client 144 may function similarly to CRM client 132. CRM client 144 may allow the expert to interact with the customer account. Since the expert's user account with CRM server system 110 is linked with higher access permissions, as stored in access permissions database 175, the expert may be permitted to perform various functions through CRM client 144 that the agent is not permitted to perform through CRM client 132. Linked with CRM client 144 may be CRM chat tool 146 that allows the expert to provide chat messages that are routed to CRM chat tool 134 via network 150 and chat service 124. CRM chat tool 134 may be launched from within CRM client 144 and may also include the option to launch remote controller 148.

Remote controller 148 may permit expert CRM client system 140 to assume control of agent CRM client system via remote controller 136. If an expert activates remote controller 148, an agent operating the system with which a chat session is active may be prompted as to whether the agent wishes to pass control of agent CRM client system 130 to the expert operating expert CRM client system 140. If the agent assents, the expert operating expert CRM client system 140 may be able to view CRM client 132 of agent CRM client system 130. The agent may then watch how the expert is controlling CRM client 132 and, possibly, learn how to perform a task.

It should be understood that agent CRM client system 130 and expert CRM client system 140 may be a laptop, desktop, or some other form of computerized device that allows a user to access a web browser. Whether such a computer system functions as an expert CRM client system or an agent CRM client system may be based on the user account under which the user logs in to CRM server system 110.

After a chat session between an agent and an expert, both the agent and the expert may have the option of using CRM chat tool 134 and CRM chat tool 146, respectively, to leave feedback about interactions with the other party. Such feedback may be stored to feedback database 177. In the case of the agent, the agent may be permitted to leave feedback providing a rating about the expertise and service provided by the expert. In the case of the expert, the expert may be permitted to leave feedback providing a rating about the agent. The expert may also be permitted to attach tags to particular types of requests or issues, flag particular requests or agents for follow up with a supervisor, and/or attach notes to the customer account or the specific request received from the agent.

While an agent is using expert CRM client system 140, the expert may be able to update his current status. This current status may indicate whether the expert is available or not available for taking chat requests from requesting agents. The expert may be able to use CRM chat tool 146 to submit a current status to available experts database 171. Available experts database 171 may maintain a listing of which experts are currently available in which languages and for what subject matter.

Template creator 126 may be used on CRM communication server system 120 to define new routing rules or modify existing routing rules that are part of routing rules database 123. CRM communication management system 160 may represent a computer system operated by an administrator. The administrator may use CRM communication management system 160 to access CRM communication server system 120 via network 150. Alternatively, an administrator may directly interact with CRM communication server system 120. An administrator may determine that a new type of issue is frequently occurring for agents. In order to resolve this issue, a particular type of expert needs to engage with the agent and provide assistance. The administrator may use CRM communication management system 160 to access template creator 126. Using template creator 126, the administrator may define one or more fields of subject matter expertise necessary for an expert to have in order to resolve the issue. The administrator may link these fields of subject matter expertise with the issue. Routing rules database 123 may be updated such that only experts that have the requisite subject matter expertise may receive chat requests that are linked with the issue. Such experts may be required to be indicated as available in available experts database 171. Template creator 126 may provide a user interface that allows administrator using CRM communication management system 160 to select various forms of expertise that are required for a given issue. Template creator 126 may represent software or firmware that is executed by CRM communication server system 120. Alternatively, specialized hardware may be used to implement template creator 126.

Figure 2:
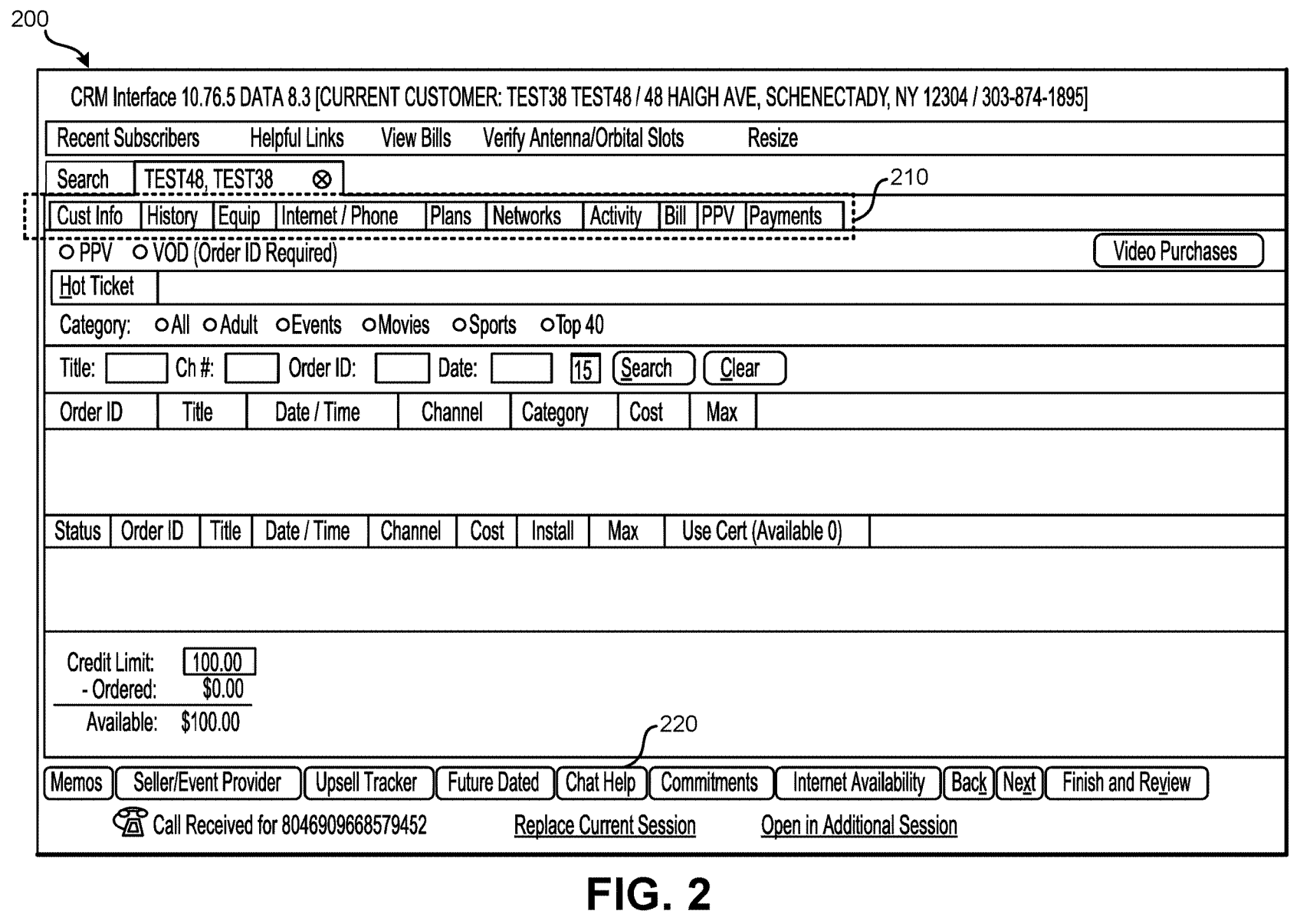

Additional detail regarding system 100 is provided in reference to the interface that is detailed in relation to FIGS. 2-8. FIG. 2 illustrates an embodiment 200 of an agent CRM interface having an option to contact an expert. Embodiment 200 can represent an interface presented in a web browser by CRM client 132. This interface may be served to agent CRM client system 130 from CRM server system 110. Alternatively, embodiment 200 may represent a native application that is executed on agent CRM client system 130 and receives data from CRM server system 110. In the illustrated embodiment 200, the agent CRM interface is particularly directed to a television service provider CRM system. The agent may review the types of equipment, Internet and phone plan, television plans, recent activity, pay-per-view activity, and recent payments, among other data, linked to a particular customer account. Such data may be accessible via tabs 210. Within the agent CRM interface, a graphical element may be present that allows the agent to request chat-based help with an expert. Element 220 may be clicked or otherwise selected by the agent in order to trigger chat-based help with an expert. As a simple example, the agent may require help from an expert when the credit limit for ordering pay-per-view television programs has been exceeded within a given time frame by the customer. The agent, acting alone, may not have sufficient permissions with the CRM system to be able to override the default credit limit.

Figure 3:
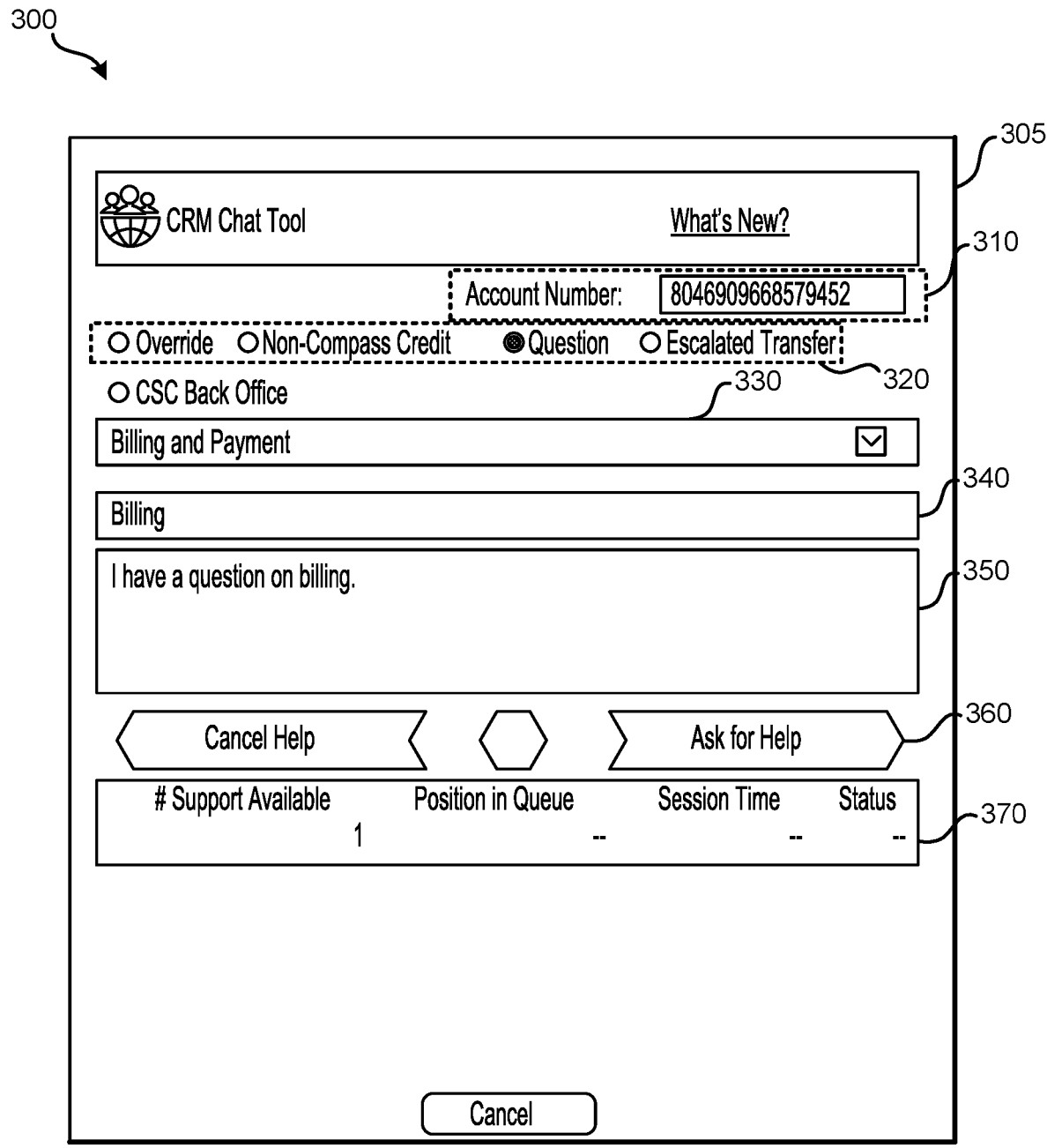
FIG. 3 illustrates an embodiment of a chat interface presented to an agent.

After an agent has selected element 220, an interface may be presented that allows the agent to specifically state the issue with which he requires help. FIG. 3 illustrates an embodiment of a chat interface 300 presented to an agent. Chat interface 300 may be presented by CRM chat tool 134 within a web browser or as a separate native application executed by agent CRM client system 130. By selecting element 220, window 305 may be launched and customer account identifier 310 may automatically be populated. The agent may then select a category 320 of the issue with which the agent requires assistance. In response to category 320 being selected, the agent may then select a subcategory 330 within the selected category; for example, a subcategory pulldown menu may be used. In some embodiments, a second-level subcategory 340 may be selected. Of course, it should be understood that the radio buttons and pulldown menu examples of chat interface 300 are merely exemplary, in different embodiments different forms of user interaction elements may instead be used.

In region 350, the agent may be able to type a message to be sent to the expert, which may detail the specifics of the assistance he requires. By activating element 360, the CRM chat tool may send the chat request to CRM communication server system 120 for routing to an appropriate expert CRM client system. In region 370, based on the agent's selection of category 320, subcategory 330, and/or second-level category 340, information about the number of available experts, and the position in which the agent is waiting for help from the expert may be presented.

Figure 4:
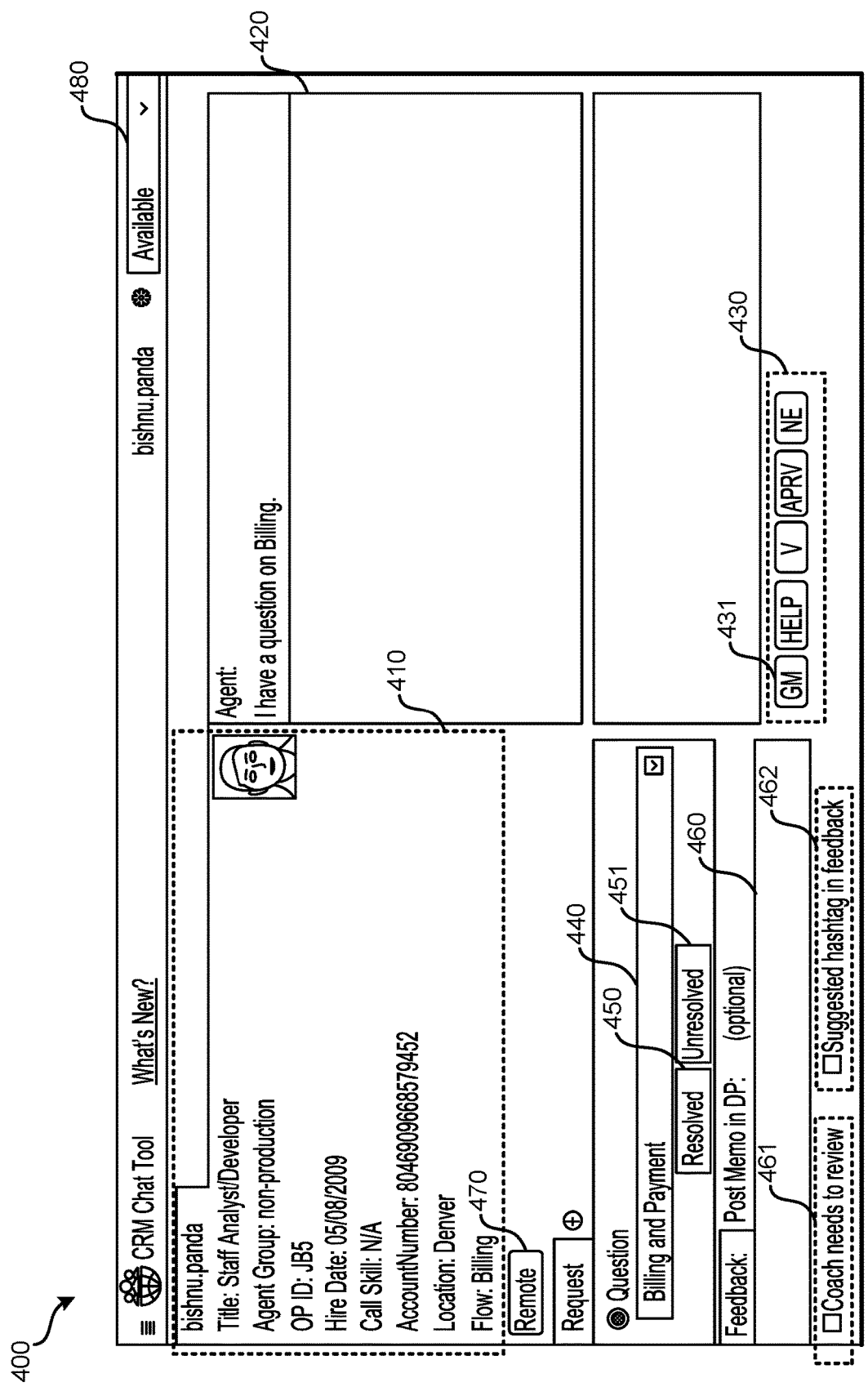
FIG. 4 illustrates an embodiment of a chat interface presented to an expert.

In response to receiving the chat request, routing engine 122 of CRM communication server system 120 routes the chat request to a particular expert using an expert CRM client system, such as expert CRM client system 140. FIG. 4 illustrates an embodiment of a chat interface 400 presented to an expert. Chat interface 400 may be presented by CRM chat tool 146 within a web browser or as a separate native application executed by expert CRM client system 140. Upon receiving a chat request, region 410 may provide information about the agent from whom the chat request has been received. Region 410 may indicate: the agent's name, the agent's title, the agents group, the agents hire date, a skill level associated with the agent, an account number associated with the agent, a picture of the agent, and a location of the agent. Chat region 420 may permit the expert to enter text to be transmitted to the agent and to view messages received from the agent. The expert may be permitted to define various chat macros that allow the expert to send commonly sent messages to the agent using only a single keystroke or selection. For example, selecting element 431 may result in "Good morning! How may I help you?" being populated into chat region 420 for sending to the agent. Region 440 may allow the expert to reclassify the received request. That is, the expert may select a different category, subcategory, and/or second-level subcategory. Once the issue with the agent has been resolved, the expert may provide input using elements 450 and 451 that indicate whether the subject of the request was resolved or not resolved. The expert may be able to provide feedback in feedback region 460. This feedback may be about the issue that was the subject of the request or about the agent that initiated the chat request. Within feedback region 460, the expert may create one or more tags to allow for easy searching for the record of the chat request. For instance, if the expert has been noting that a particular software bug has been causing multiple calls regarding unexpected channel changes, the expert may input several tags (such as #software_bug, #channel_change) into feedback region 460 and may select element 462 to indicate that feedback region 460 contains one or more tags to be used for searching. Element 461 may be used by the expert to specify whether a supervisor, coach, or other member of management should review the particular chat request and/or contact the agent for follow-up. For example, element 461 may be selected if the expert believes the agent requires further training.

Selection of element 470 may trigger a request to be transmitted to the agent CRM client system for the expert to assume remote control of the agent CRM client system or at least the CRM client being executed by the agent CRM client system. Upon selection of element 470, the agent may be prompted to accept or deny such control being passed to the expert. If the agent assents, the expert's interface may present a view of the agent's desktop or CRM client 132. The expert may then directly control input provided to agent CRM client system 130 and the agent may be permitted to watch as the expert performs such input. Such an arrangement may serve as a training opportunity for the agent by watching how the expert performs a particular task.

Status selector 480 may allow the expert to indicate whether he is currently available or unavailable to receive chat requests from agents. If the agent specifies available using status selector 480, the expert may be eligible to receive new chat requests from agents. The expert may have the option of selecting among various unavailable options, such as unavailable due to being on a break, away on training, in a meeting, or undergoing a coaching session. The particular reasons for being unavailable may vary by embodiment.

Figure 5:
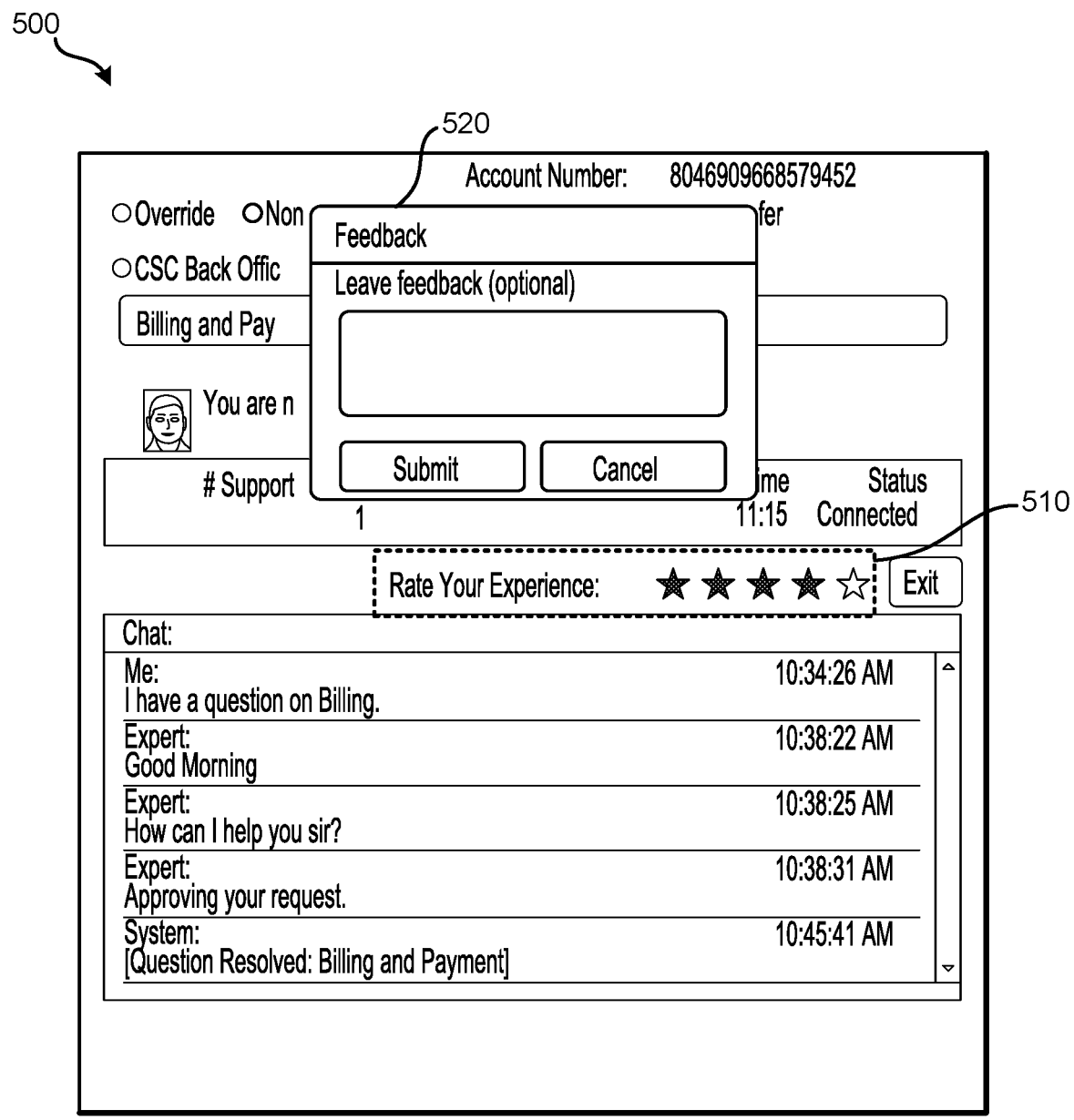
FIG. 5 illustrates an embodiment of a feedback interface presented to an agent.

FIG. 5 illustrates an embodiment of a feedback interface 500 presented to an agent. Such an interface allows the agent to submit a score using element 510, such as a number of stars, and/or provide typed feedback comments via feedback region 520. These feedback comments may be routed to feedback database 177 and may be linked with a user account of the expert. Additionally or alternatively, the feedback may be linked with the type of request initiated by the agent. For example, the feedback may be more pertinent to the type of issue rather than the expert who helped try to resolve the issue.

Figure 6:
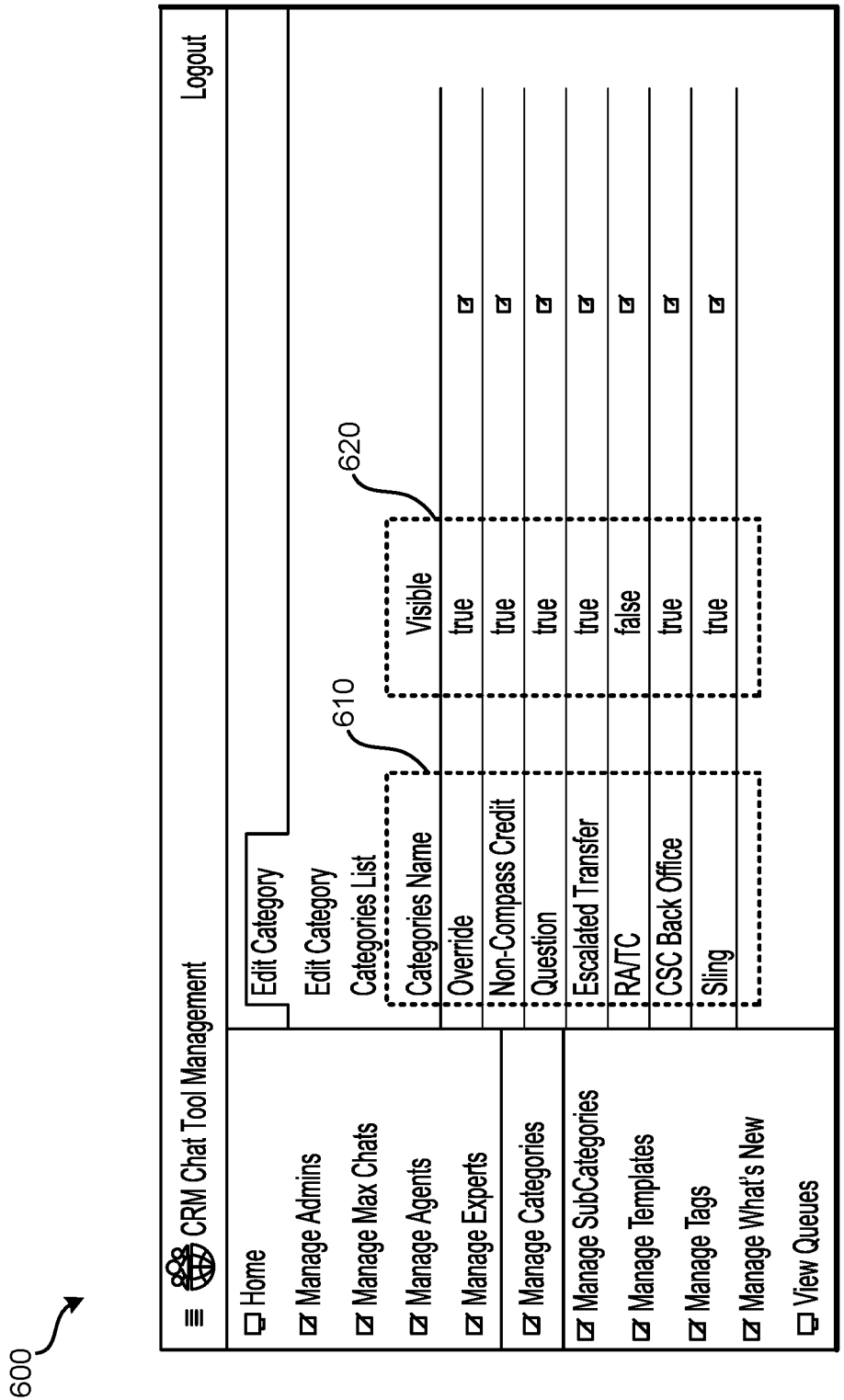
FIG. 6 illustrates an embodiment of an administration interface that adjusts the types of requests that an agent can request.
Figure 7:
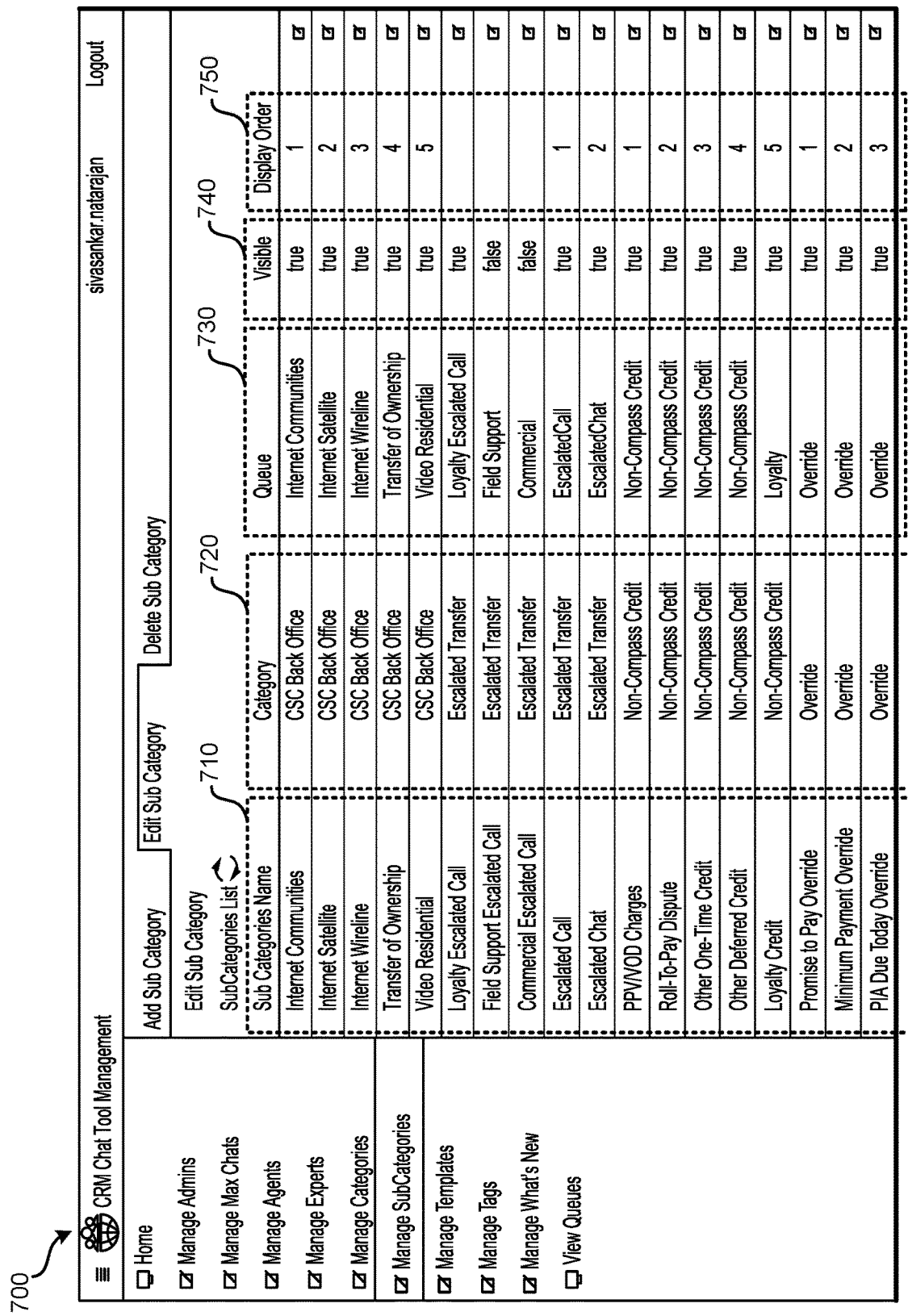
FIG. 7 illustrates an embodiment of an administration interface that adjusts the subtypes of requests that an agent can request.

FIG. 6 illustrates an embodiment of an administration interface 600 that adjusts the types of requests that an agent can request. Administrator, such as an administrator using CRM communication management system 162, may access CRM communication server system 120, may use administration interface 600 to set which possible categories an agent may select when submitting a chat request. The administrator may create, modify, or delete a category name 610 and can use visibility selector 620 to indicate whether each category is visible (i.e. enabled) for selection by agent. FIG. 7 illustrates an embodiment of an administration interface 700 that adjusts the subcategories in which an agent can request assistance from an expert. The administrator may adjust subcategory name 710. Each subcategory may be assigned to a particular category 720, which was set using administration interface 600. Queue 730 may define which group of experts handles a particular subcategory. Visibility 740 may indicate whether the subcategory is available for selection by an agent. Display order 750 may adjust the order in which the subcategories display in a menu associated with the linked category.

Figure 8:
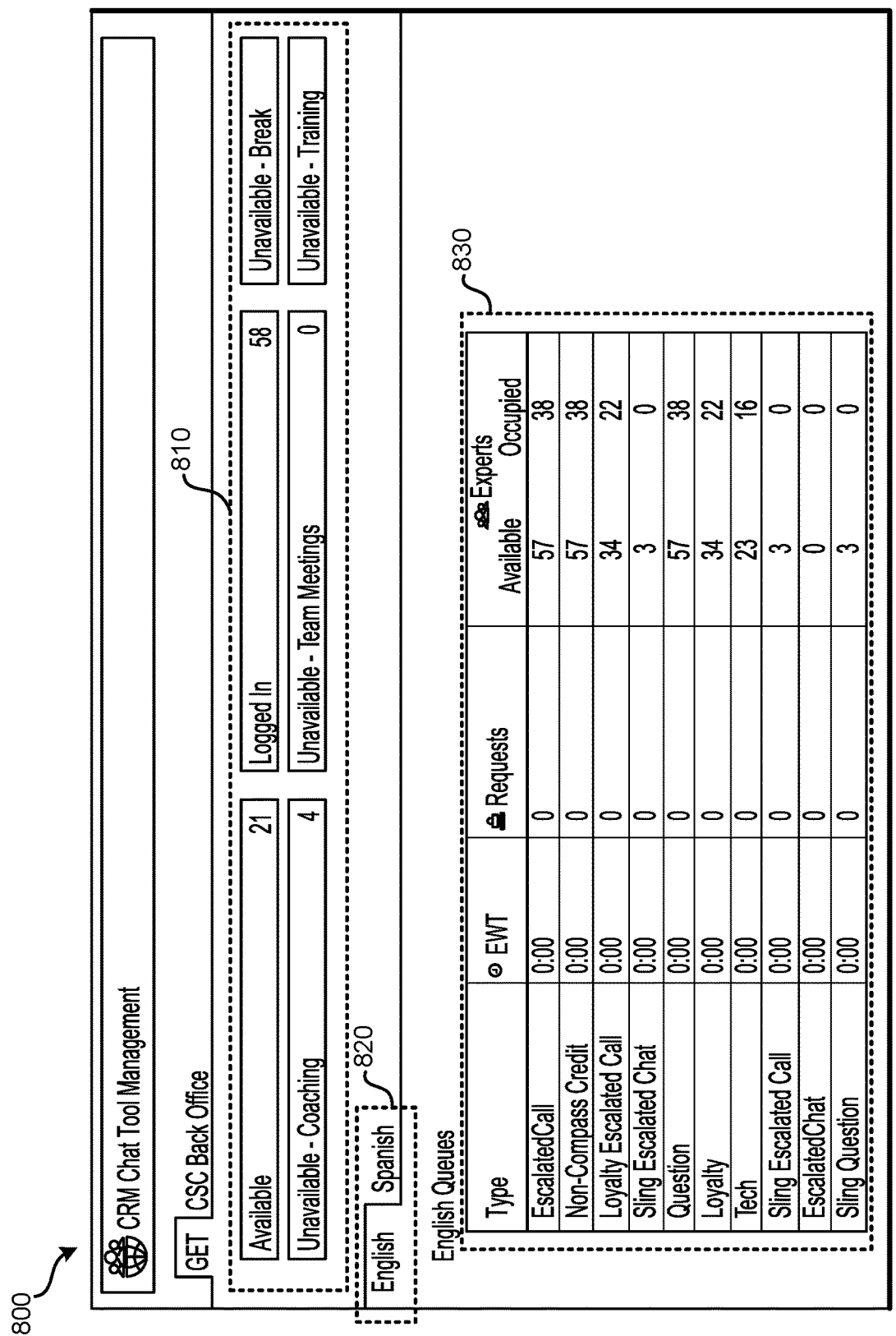
FIG. 8 illustrates an embodiment of an administration interface for monitoring the number of pending requests and an estimated wait time for various categories of chat requests from agents.

FIG. 8 illustrates an embodiment of an administration interface 800 that allows an administrator to monitor the number of pending requests an estimated wait time for various categories of chat requests from agents. Region 810 may indicate the statuses of all experts who are currently logged in to expert CRM client systems. Region 810 may indicate whether the experts are available or unavailable, and may possibly indicate why particular experts are unavailable. Such data may be gathered by CRM communication server system 120 and stored to available experts database 171. This data may be gathered based on an expert indicating his availability using status selector 480 of chat interface 400.

Administration interface 800 may include selections for different languages. That is, different queues for different languages may be maintained. Such an arrangement may allow an agent to communicate with an expert proficient in the agent's language. Status queue 830 may indicate a category or subcategory of type of issue that an agent can submit, an estimated wait time to chat with an expert for that particular type of issue, the number of requests pending for chat for that particular type of issue, and the number of occupied and available experts for that particular type of issue. Such an arrangement can allow an administrator to see what particular types of issues show the longest wait times for an agent to speak with an expert. It may be possible to bring additional experts online or reassign experts to help resolve long wait times.

Figure 9A:
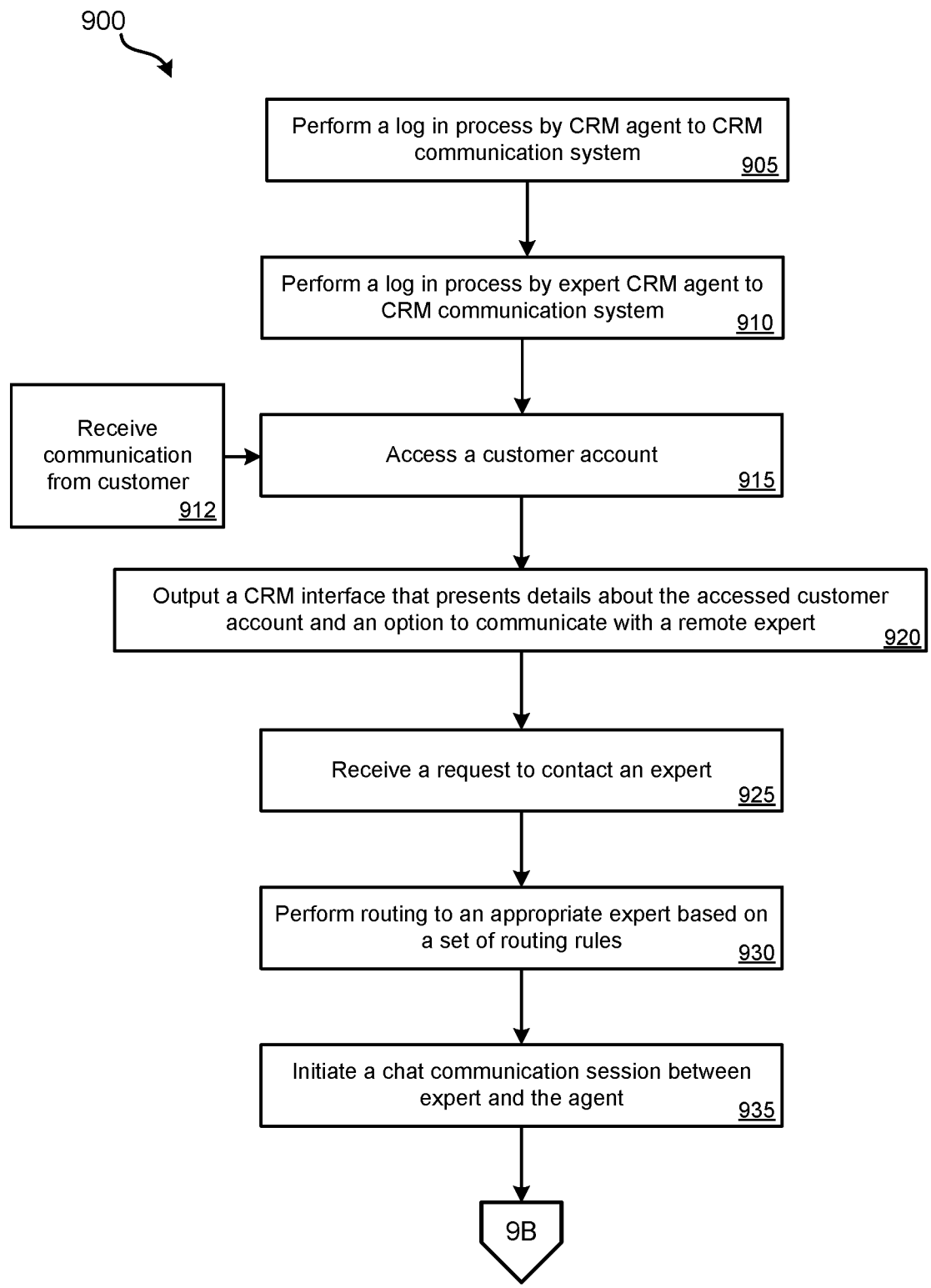
FIGS. 9A and 9B illustrate an embodiment of a method for providing CRM integrated chat.
Figure 9B:
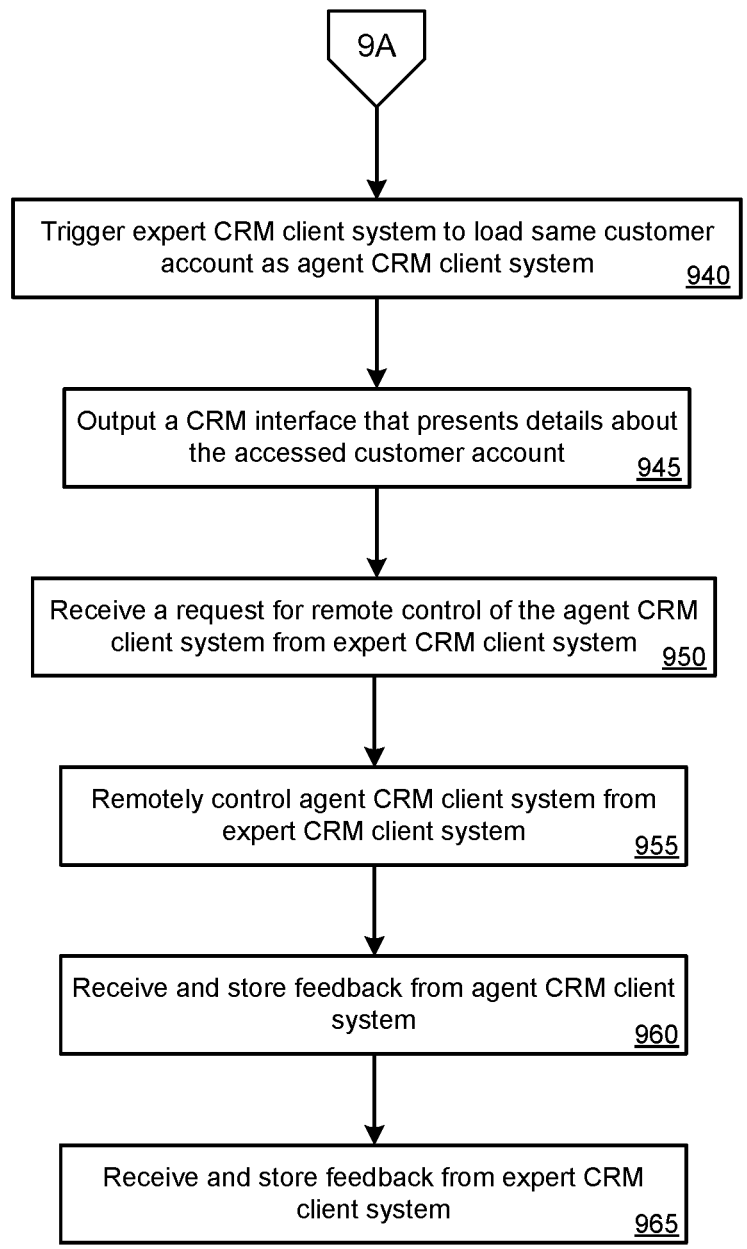

Various methods may be performed using the system of FIG. 1 and the interfaces of FIGS. 2-8. FIGS. 9A and 9B illustrate an embodiment of a method 900 for providing CRM integrated chat between an agent and an expert that are each affiliated with a same entity, such as a television service provider. Method 900 may be performed using system 100 of FIG. 1 or a similar system that provides access to a CRM system and CRM communication system that provides chat services. At block 905, a CRM agent may perform a login process to a CRM communication system and to a CRM server system. In some embodiments, by virtue of the CRM agent logging in to the CRM server system, the agent may automatically be logged into the CRM communication server system, which enables chat services. An agent may use an agent CRM client system to submit a username and password for logging in (or logging in may be accomplished via some other arrangement, such as biometrics). Based on access permissions stored for the agent, the agent may be granted permissions to perform certain actions with respect to customer accounts stored in a customer accounts database using a CRM server system. At block 910, a CRM expert may perform a login process to the CRM communication system and the CRM server system. In some embodiments, by virtue of the CRM expert logging in to the CRM server system, the expert may automatically be logged into the CRM communication server system which enables chat services. An expert may use an expert CRM client system to submit a user name and password for logging in. Based on access permissions stored for the expert, the expert may be granted permissions to perform certain actions with respect to customer accounts stored in a customer accounts database using the CRM server system. The expert may have greater access permissions than the agent who logged in at block 905. The CRM communication server system may present the agent with an agent-side CRM chat tool (which may generate outbound chat requests). The CRM communication server system may present the expert with an expert-side CRM chat tool (which may only be able to receive in-bound chat requests).

At block 915, the agent may use the CRM server system to access a user account. The user account may be accessed in response to receiving a communication from the customer at block 912. For example, a customer may call a support hotline and be connected with the agent. In order for the agent to assist the customer, the agent may use the CRM server system to access a customer account linked with the customer from whom the communication was received at block 912. Rather than calling, the customer may use a text chat-based interface, email, social media, or some other communication arrangement to communicate with the agent.

At block 920, a CRM interface may be output for presentation to the agent that presents details about the accessed customer account. The CRM interface may present the option for the CRM agent to communicate with a remote expert. For example, referring to FIG. 2, within the CRM interface, the agent may have the option of launching a CRM chat tool. In some embodiments, rather than a login process being performed, the CRM communication server system at block 905, a login process may only be performed with the CRM communication server system when the user has selected an element within the CRM interface that causes the CRM chat tool to be launched. The CRM chat tool may be launched within the same CRM interface or a separate interface, such as a separate window, may be launched. At block 925, the agent may select the element that causes a request for chat to be submitted. At block 925, the agent may select particular options relating to the issue with which the agent requires assistance. For example, the agent may select a category, subcategory, and, possibly, a second-level subcategory. In some embodiments, the agent may type out a question or request that is to be submitted to the expert for review.

When the agent submits the request, the request may be routed to the CRM communication server system and may be analyzed by a routing engine executed by the CRM communication server system at block 930. The routing engine may use various routing rules to determine which expert the chat request should be routed to. Based on the submitted category, subcategory, and/or second-level subcategory, an expert may be selected. The submitted category, subcategory, and/or second-level subcategory may be compared to tags linked with the account of the experts to determine an expert that has proper subject matter expertise in the submitted categories. An expert may additionally or alternatively be selected based on an amount of idle time that has elapsed since the expert concluded a chat session with another agent. An expert may additionally or alternatively be selected based on being linked with a particular language in which the agent will communicate. For instance, agents may primarily be Spanish-speaking for Spanish-speaking countries, while other agents may primarily be English-speaking for English-speaking countries.

At block 935, based upon the routing performed at block 930, a chat communication session between a selected expert and the agent may be initiated. As long as the chat session is active, the expert and the agent may exchange typed messages. At block 935, a CRM chat interface may be presented to both the agent and the expert. Such an interface may present to the expert information about the agent and the agents initial question. Both the agent and the expert may be able to type messages to each other using the respective CRM chat interfaces. At block 940, which is on FIG. 9B where method 900 continues, based on the routing performed at block 930, the expert CRM client system may be triggered to load the same customer account identifier within the expert's CRM client as was submitted in the chat request from the agent. The CRM communication system may transmit an indication of a customer account identifier to a particular port of the expert CRM client system. In response to receiving the customer account identifier on a particular port, the expert CRM client system may be triggered to load the customer account within the expert's CRM client or may be triggered to ask the expert via an onscreen request if the customer account is to be loaded within the expert's CRM client at block 945. Therefore, once block 945 has been performed, both the agent and the expert may be viewing the same customer account using their respective CRM clients.

In some embodiments, the expert may be able to resolve the question or request that the agent had via chat. In other embodiments, the expert may directly make an edit to the customer account based on the request or question from the agent. In other situations, however, the expert may need to assume control of the agent's CRM client in order to show or teach the agent how to perform a particular task. At block 950, a request for remote control of the agent CRM client system may be received. Such a request may be submitted by the expert selecting a particular element present within the CRM chat tool. This element may cause a remote control request to be transmitted to the agent CRM client system. The agent may then have the opportunity to accept or block this request. If accepted, at block 955, the expert CRM client system may be placed in control of the agent CRM client system. Therefore, the expert may view the CRM interface and possibly other interfaces of the agent and may perform a task, which the agent can view locally at the agent CRM client system.

Once the question or issue has been resolved, the agent or expert may submit a request through the CRM chat tool that the chat sessions be ended. Once the chat session has ended, the agent and/or the expert may have the opportunity to leave feedback. In some embodiments, the expert may have the option of creating feedback within the CRM chat tool while the chat session is in progress. At block 960, the agent may submit a rating for the expert and/or any comments about the problem, issue, or expert that is desired to be stored in a feedback database. At block 965, the expert may attach tags to the request such that by a search being performed within the feedback database for one or more of the tags results in the session between the agent and expert being identified. The expert may also submit a rating for the agent, comments about the agent, an indication that a superior should discuss the session with the agent and/or flag the session for further review. The feedback submitted by the expert may be stored to a feedback database and linked with an account of the agent and/or a session database that maintains a record of chat sessions between agents and experts.

Figure 10:
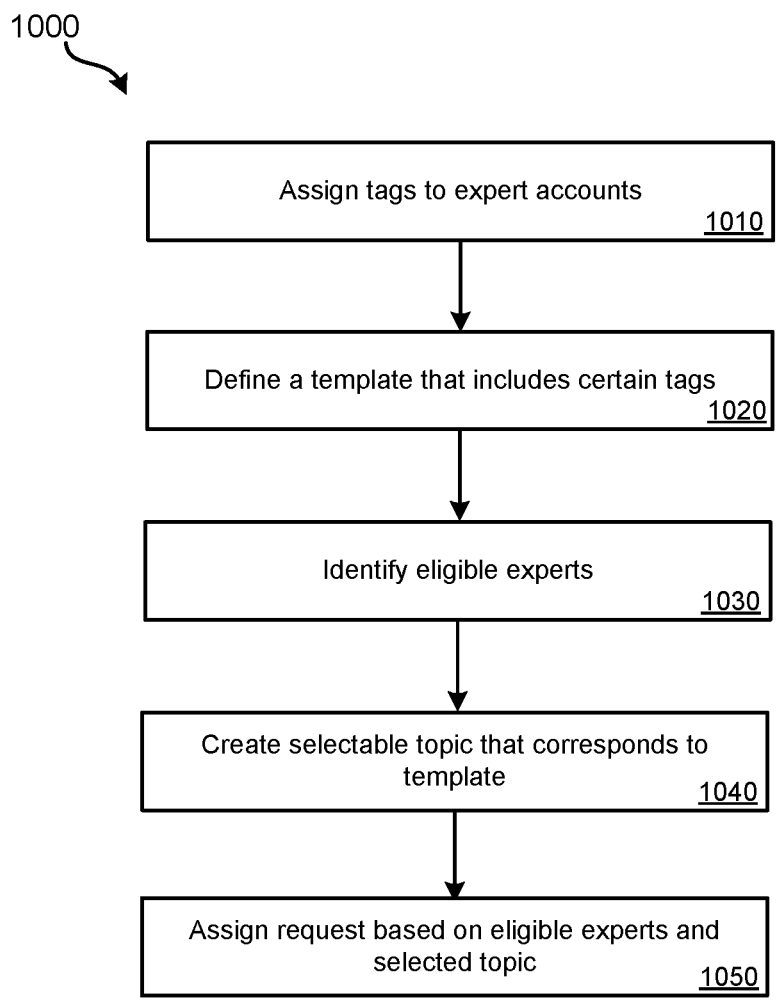
FIG. 10 illustrates an embodiment of a method for using a template to determine eligible experts for a type of request.

FIG. 10 illustrates an embodiment of a method for using a template to determine eligible experts for a type of request. Method 1000 may be performed using system 100 of FIG. 1 or a similar system that provides access to a CRM system and CRM communication system that provides chat services. Method 1000 may be performed to set the routing such that when a routing request is received from an agent CRM client system, the request is routed to an appropriate expert in the appropriate subject matter. At block 1010, various tanks may be assigned to accounts linked with experts. Each tag may assign a particular skill to the expert, such as a particular language and/or a particular area of expertise.

At block 1020, a template may be created that indicates particular tags. This template may be linked with a particular type of problem or request that is expected to cause agents to submit expert chat requests. At block 1030, eligible experts may be identified by determining which experts have the appropriate tags linked with their accounts that were indicated as necessary in the defined template of block 1020.

At block 1040, a selectable topic may be created that is linked to the template. The selectable topic may be defined by a category, subcategory, and possibly, a second-level subcategory. This selectable topic may be added to the CRM chat request interface such that if an agent selects the category, the subcategory, and, possibly, second-level subcategory for the expert chat request, the agent will cause the routing engine of the CRM communication server system to route the chat request to an expert that has been identified as an expert in the subject matter on the basis of the expert having been assigned tags that match tags that have been linked with the template.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for allowing a remote expert to assist a customer relationship management (CRM) agent, the method comprising:
performing, by a CRM client system, a login process to log in the CRM agent to the CRM client system that accesses a CRM communication system;
accessing, by a CRM client system, a customer account;
outputting, by the CRM client system, a first CRM interface that presents details about the accessed customer account and an option to remotely contact an expert, wherein the expert has more access rights to the CRM communication system than the CRM agent;
receiving, by the CRM client system, a request to contact the expert and a selection of a subject matter from a plurality of subject matters;
outputting, by the CRM client system, in response to receiving the request and based at least in part on the selection of the subject matter, information about a number of available experts for the subject matter and a position in which the CRM agent is waiting for help from the available experts;
routing, by the CRM communication system, the request to the expert based on expert routing rules enforced by the CRM communication system;
in response to the routing, initiating, by the CRM communication system, to an expert CRM client system to which the expert has logged in, a chat communication session;
in response to the routing, causing, by the CRM communication system, the expert CRM client system to access the customer account;
outputting, by the expert CRM client system, a second CRM interface that presents details about the accessed customer account and a chat interface to communicate with the CRM agent via the CRM client system;
outputting, by the CRM client system to the CRM agent, a feedback interface that solicits for a numerical feedback score for the expert and feedback comments for the expert; and
linking feedback received via the feedback interface with a user account of the expert.

2. The method for allowing the remote expert to assist the CRM agent of claim 1, further comprising:
receiving, by the expert CRM client system, a request for remote control of the CRM client system;
transmitting, by the CRM communication system, the request for remote control to the CRM client system; and
providing, by the CRM client system, control of the first CRM interface to the expert CRM client system.

3. The method for allowing the remote expert to assist the CRM agent of claim 1, further comprising:
routing, by the CRM communication system, chat messages from the CRM client system to the expert CRM client system and from the expert CRM client system to the CRM client system.

4. The method for allowing the remote expert to assist the CRM agent of claim 1, wherein causing the expert CRM client system to access the customer account comprises:
transmitting, by the CRM communication system, an account identifier of the customer account to a designated port of the expert CRM client system; and
loading, by the expert CRM client system, the customer account using the account identifier.

5. The method for allowing the remote expert to assist the CRM agent of claim 1, further comprising:
receiving, from the expert CRM client system, feedback indicative of a competency level of the CRM agent; and
updating, by the CRM communication system, a database entry linked with the CRM agent.

6. The method for allowing the remote expert to assist the CRM agent of claim 5, wherein the feedback further comprises:
receiving, from the expert CRM client system, one or more tags to classify a type of issue experienced by the CRM agent; and
updating, by the CRM communication system, a database entry linked with a session.

7. The method for allowing the remote expert to assist the CRM agent of claim 1, wherein routing the request to the expert comprises selecting the expert from a plurality of experts based on an idle time since a previous request was resolved.

8. The method for allowing the remote expert to assist the CRM agent of claim 7, wherein routing the request to the expert comprises selecting the expert from a plurality of language groups based on a language indicated by the request.

9. The method for allowing the remote expert to assist the CRM agent of claim 1, further comprising:
assigning, by the CRM communication system, one or more subject matter tags to an expert user account linked with the expert, wherein the subject matter tags define subjects in which the expert is proficient; and
updating a database entry for the expert to include the one or more subject matter tags.

10. A system for allowing a remote expert to assist a customer relationship management (CRM) agent, the system comprising:
a CRM client computer system, comprising one or more processors, configured to:
perform a login process to log in the CRM agent to the CRM client computer system that accesses a CRM communication computer system;
access a customer account;
output a first CRM interface that presents details about the accessed customer account and an option to remotely contact an expert, wherein the expert has more access rights to the CRM communication computer system than the CRM agent;
receive a request to contact the expert and a selection of a subject matter from a plurality of subject matters;
in response to receiving the request and based at least in part on the selection of the subject matter, output, to the CRM agent, information about a number of available experts for the subject matter and a position in which the CRM agent is waiting for help from the available experts;
output a feedback interface that solicits for a numerical feedback score for the expert and feedback comments for the expert; and
cause feedback received via the feedback interface to be linked with a user account of the expert; and
the CRM communication computer system, configured to:
route the request to the expert based on expert routing rules enforced by the CRM communication computer system;
in response to the routing, initiate with an expert CRM client computer system to which the expert has logged in, a chat communication session;
in response to the routing, cause the expert CRM client computer system to access the customer account; and the expert CRM client computer system, configured to present details about the accessed customer account and a chat interface to communicate with the CRM agent via the CRM client computer system.

11. The system for allowing the remote expert to assist the CRM agent of claim 10, wherein:
the expert CRM client computer system is further configured to receive a request for remote control of the CRM client computer system;
the CRM communication computer system is further configured to transmit the request for remote control to the CRM client computer system; and
the CRM client computer system is further configured to provide control of the first CRM interface to the expert CRM client computer system.

12. The system for allowing the remote expert to assist the CRM agent of claim 10, wherein the CRM communication computer system is further configured to route chat messages from the CRM client computer system to the expert CRM client computer system and from the expert CRM client computer system to the CRM client computer system.

13. The system for allowing the remote expert to assist the CRM agent of claim 10, wherein the expert CRM client computer system accessing the customer account comprises:
the CRM communication computer system being configured to transmit an account identifier of the customer account to a designated port of the expert CRM client computer system; and
the expert CRM client computer system loading the customer account using the account identifier.

14. The system for allowing the remote expert to assist the CRM agent of claim 10, wherein:
the expert CRM client computer system is further configured to receive feedback indicative of a competency level of the CRM agent; and
the CRM communication computer system is further configured to update a database entry linked with the CRM agent.

15. The system for allowing the remote expert to assist the CRM agent of claim 14, wherein the feedback further comprises:
the expert CRM client computer system being configured to receive one or more tags to classify a type of issue experienced by the CRM agent; and
the CRM communication computer system being configured to update a database entry linked with a session.

16. The system for allowing the remote expert to assist the CRM agent of claim 10, wherein routing the request to the expert comprises selecting the expert from a plurality of experts based on an idle time since a previous request was resolved.

17. The system for allowing the remote expert to assist the CRM agent of claim 16, wherein routing the request to the expert comprises selecting the expert from a plurality of language groups based on a language indicated by the request.

18. The system for allowing the remote expert to assist the CRM agent of claim 10, wherein:
the CRM communication computer system being configured to assign one or more subject matter tags to an expert user account linked with the expert, wherein the subject matter tags define subjects in which the expert is proficient; and
the CRM communication computer system being configured to update a database entry for the expert to include the one or more subject matter tags.

19. An apparatus for allowing a remote expert to assist a customer relationship management (CRM) agent, the apparatus comprising:
means for accessing a customer account;
means for outputting a first CRM interface that presents details about the accessed customer account and an option to remotely contact an expert;
means for receiving a request to contact the expert and a selection of a subject matter from a plurality of subject matters;
means for outputting information about a number of available experts for the selected subject matter and a position in which the CRM agent is waiting for help from the available experts;
means for routing the request to the expert based on enforced expert routing rules;
means for initiating a chat communication session with the expert;
means for causing an expert CRM client system being used by the expert to access the customer account;
means for outputting a second CRM interface that presents details about the accessed customer account and a chat interface to communicate with the CRM agent;
means for outputting a feedback interface that solicits for a numerical feedback score for the expert and feedback comments for the expert; and
means for linking feedback received via the feedback interface with a user account of the expert.

* * * * *